(12) United States Patent
Piccolo

(10) Patent No.: US 8,882,062 B2
(45) Date of Patent: Nov. 11, 2014

(54) SHAPEABLE SUPPORT STAND

(75) Inventor: Jonathan A. Piccolo, Miami, FL (US)

(73) Assignee: Wedgeworks, LLC, Miami, FL (US)

( * ) Notice: Subject to any disclaimer, the term of this patent is extended or adjusted under 35 U.S.C. 154(b) by 30 days.

(21) Appl. No.: 12/926,675

(22) Filed: Dec. 2, 2010

(65) Prior Publication Data

US 2011/0210224 A1 Sep. 1, 2011

Related U.S. Application Data

(60) Provisional application No. 61/266,160, filed on Dec. 3, 2009.

(51) Int. Cl.
*F16M 13/00* (2006.01)

(52) U.S. Cl.
USPC ........ 248/160; 248/121; 248/139; 248/176.1; 248/309.1; 248/450; 248/918

(58) Field of Classification Search
USPC ........... 248/118, 118.1, 118.5, 160, 456, 460, 248/454, 121, 139, 176.1, 918, 309.1; 128/845; 5/648, 652
See application file for complete search history.

(56) References Cited

U.S. PATENT DOCUMENTS

| | | | | |
|---|---|---|---|---|
| 1,778,545 A * | 10/1930 | Allen | | 248/105 |
| 2,281,629 A * | 5/1942 | Snow | | 5/655 |
| 3,223,568 A | 12/1965 | Alderfer | | |
| 4,027,888 A * | 6/1977 | Wilcox | | 297/452.17 |
| 4,162,696 A | 7/1979 | Sprung | | |
| 4,345,633 A | 8/1982 | Gilmore | | |
| 4,970,742 A * | 11/1990 | Keener | | 5/633 |
| 5,134,739 A * | 8/1992 | Gaffe et al. | | 5/648 |
| 5,143,341 A * | 9/1992 | Juster | | 248/444 |
| 5,477,866 A * | 12/1995 | Davenport | | 5/648 |
| D389,360 S * | 1/1998 | York et al. | | D6/601 |
| 6,270,050 B1 * | 8/2001 | Friedrich | | 248/444 |
| 7,976,228 B2 * | 7/2011 | Lambert | | 396/428 |
| D654,751 S * | 2/2012 | Newnam | | D6/601 |
| D655,285 S * | 3/2012 | Piccolo | | D14/253 |
| D668,662 S * | 10/2012 | Suiter | | D14/447 |
| 2002/0042954 A1 | 4/2002 | Straub | | |
| 2006/0165230 A1 * | 7/2006 | Parr | | 379/454 |
| 2007/0090265 A1 | 4/2007 | Fasano | | |
| 2008/0148482 A1 | 6/2008 | Gonzalez | | |
| 2010/0213343 A1 * | 8/2010 | Opresnik | | 248/451 |

OTHER PUBLICATIONS http://www.flickr.com/photos/dognamedbanjo/4295269765, PodPillow Ipod/ Mobile Device Stand, effective date Jan. 22, 2010.*
TUAW Faceoff: MovieWedge vs. MiniRizer, dated Mar. 5, 2009.

* cited by examiner

*Primary Examiner* — Amy J Sterling
(74) *Attorney, Agent, or Firm* — Dykema Gossett PLLC

(57) ABSTRACT

A shapeable support stand for items such as portable phones and cameras includes a shapeable backing member, a footer member and a spacer member therebetween, the spacer member providing a channel between the backing member and the footer member which is open at both ends and thus can accommodate items having widths greater than that of the support stand. The support stand can be made from a single piece of pliable fabric which is sewn to provide all three members, with the pliable fabric of the backing member containing a shapeable filler such as beads. The pliable fabric is advantageously microsuade, and the footer member can contain an elongated insert such as a tube of closed-cell extruded polystyrene foam.

1 Claim, 2 Drawing Sheets

SHAPEABLE SUPPORT STAND

CROSS-REFERENCE TO RELATED APPLICATION

Figure 1:
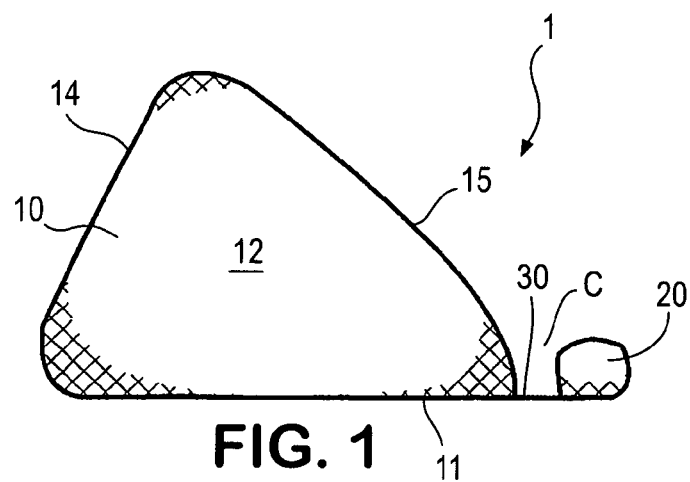

This application is based upon and claims the priority of U.S. Provisional Application 61/266,160, filed Dec. 3, 2009, the contents of which are incorporated herein by reference.

BACKGROUND OF THE INVENTION

1. Field of the Invention

The present invention relates to portable supporting devices or stands for items such as hand-held phones, photographs and cameras.

2. The Prior Art

Support stands for personal items such as cameras and portable communications devices are known. For example, U.S. Pat. No. 4,162,696 to Sprung discloses a deformable camera case which can be converted to a camera stand. The case contains loosely arranged balls in a space between an inner and outer wall to enable the case, when opened, to support the camera at a desired orientation on variously contoured surfaces. However, the case is not constructed to support items other than the camera for which it is intended. U.S. Patent Publication 2006/0165230 A1 to Parr discloses a shoe-shaped holder for a portable communications device (cell phone or cordless handset), the heel section including an opening for the lower portion of the communications device and the toe section intended to support the upper portion of the communications device. The toe section contains beads or beans within a pliable material layer to provide a generally spherical shape that is accommodating to communication devices of differing sizes and angles of inclination. However, this holder cannot hold an item whose width exceeds the opening provided in its heel section.

I have invented a shapeable support stand which is capable of holding items of various types and sizes, which have widths that are wider than the support stand itself, and which can adapt to both even and uneven underlying surfaces.

SUMMARY OF THE INVENTION

The shapeable support stand of my invention includes a backing member, a footer member and a spacer member, the spacer member interconnecting the backing member with the footer member and providing an open-ended channel therebetween. The backing member is provided by a pliable fabric containing a shapeable filler such as beads and is configured to provide a generally rectangular bottom (when placed on a horizontal surface), generally triangular sides and a generally triangular front face. As such, the backing member has a generally trilateral pyramidal configuration. The footer member is provided by a pliable fabric covering an elongated insert. The spacer member is also provided by a pliable fabric, the pliable fabric of all three members preferably being a single piece of pliable fabric suitably stitched. The item to be supported is positioned in the channel between the backing member and the footer member and leaned against the backing member, which will modify its shape (due to the filler therein) to accommodate the desired slant of the item. The shapeable support stand can be placed on flat surfaces, or on irregular or sloped surfaces and still function as a support stand due to the shapeable nature of the backing member and the pliability of the spacer member.

The invention will be better understood by reference to the attached drawings, taken in conjunction with the following discussion.

DETAILED DESCRIPTION OF THE DRAWINGS

Figure 2:
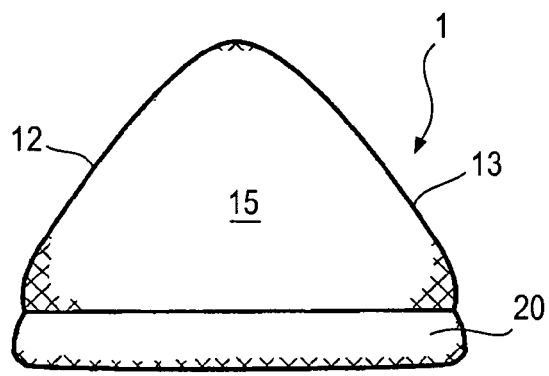
Figure 3:
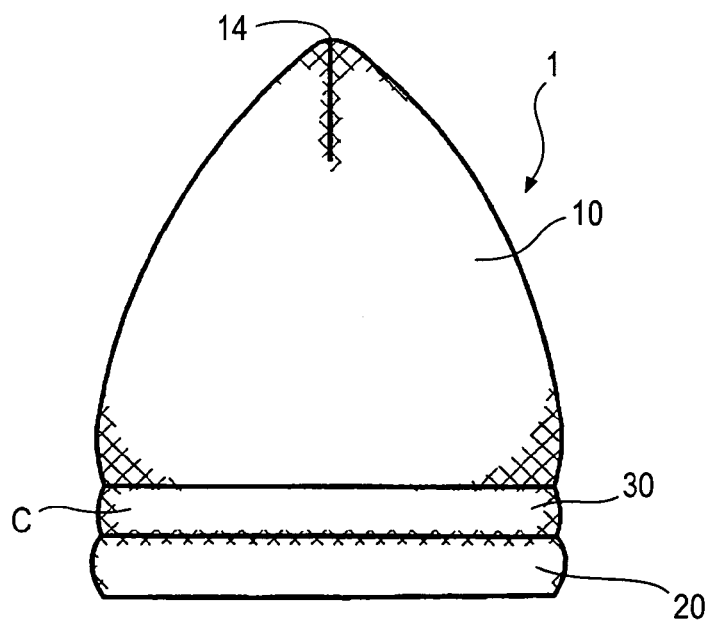
Figure 4:
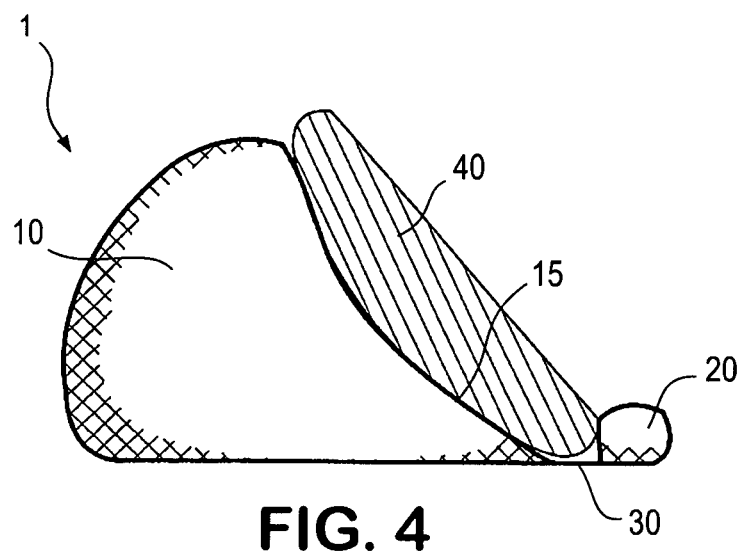
Figure 5:
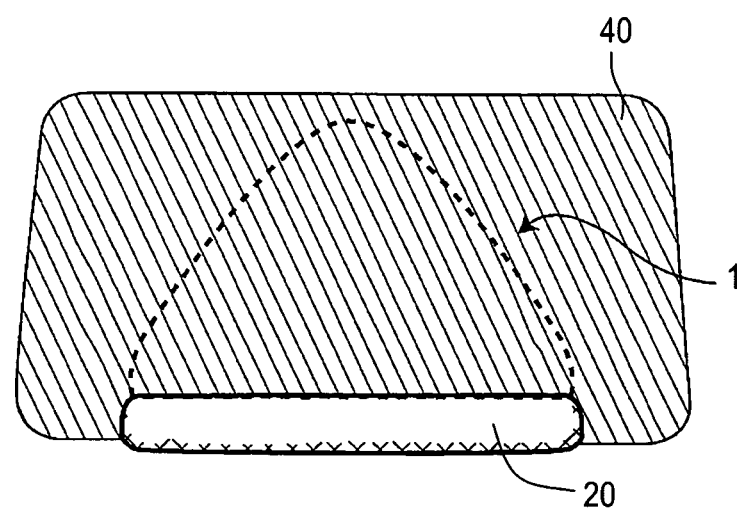

FIG. 1 is an elevational side view of a shapeable support stand according to a preferred embodiment of the invention,
FIG. 2 is an elevational front view,
FIG. 3 is a top plan view, and
FIGS. 4 and 5 show side and front views similar to FIGS. 1 and 2 but with a item supported thereon.

DETAILED DESCRIPTION OF THE PREFERRED EMBODIMENT

The shapeable support stand of the invention is generally labeled 1 in FIGS. 1-5. It includes a backing member 10, an elongated footer member 20 and a spacer member 30.

The backing member 10, which is formed by a pliable fabric containing a shapeable filler material, is generally trilaterally pyramidal in shape (when placed on a horizontal surface) and provides a generally triangular bottom 11, generally triangular sides 12 and 13 which meet at a rear seam 14, and a generally triangular front face 15. The front face provides the surface which helps support an item placed in the support stand. Because the backing member contains a shapeable filler material, the configuration of the bottom, sides and front face can be reshaped to a limited extent. The shapeable filler material can be used to fill ⅔ to 9/10 the volume of the backing member, and can be provided by beads (such as nylon beads), beans or balls. The pliable fabric can be felt, leather, woven fabric, microsuade (which displays an advantageous friction property) or any durable, puncture-resistant pliable material.

The elongated footer member is formed by a pliable fabric (preferably the same pliable fabric as used in the backing member) containing an elongated insert. The insert is desirably bendable and can be formed of a cylinder of closed-cell extruded polystyrene foam.

The spacer member 30 is also formed by a pliable fabric (preferably the same pliable fabric as used in the backing member) and it provides a channel C between the backing member and the footer member which is open at both ends.

As seen in FIGS. 4 and 5, an item 40 having a length which exceeds the width of the support stand can be placed in the channel C between the backing member and the footer member and leaned against the front face 15 of the backing member (which will easily change its shape to accommodate the desired slant of the item) to the desired viewing angle, with a portion of the item abutting the footer member 20 for stable positioning. This can occur as well on an irregular surface as the bottom 11 of the backing member and the flexing of the spacer member will accommodate irregular and sloped surfaces.

Although a preferred embodiment of the invention has been shown and described, modifications thereon can be made and still fall within the scope of the appended claims.

What is claimed is:

1. A shapeable support stand for an item which comprises:
   a shapeable backing member which can adapt to both even and uneven underlying surfaces and has a generally pyramidal shape and when placed on a horizontal support surface, has a generally triangular bottom, generally triangular sides which meet at a rear seam, and a generally triangular front face,
   an elongated footer member, and a spacer member extending between the backing member and the footer member to form an open-ended channel between the backing member and the footer member for the positioning of the item to be supported, the shapeable backing member enabling the item positioned in the channel to be positioned there against to achieve an optimum viewing angle.

\* \* \* \* \*